United States Patent
Sashinami et al.

(10) Patent No.: US 7,047,815 B2
(45) Date of Patent: May 23, 2006

(54) SENSOR AND ELECTRODE EXTRACTION STRUCTURE AND METHOD

(75) Inventors: Nobuo Sashinami, Tokyo (JP); Takashi Masuda, Gunma (JP); Kouichi Koizumi, Tokyo (JP); Hiroyuki Hamano, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/943,755

(22) Filed: Sep. 17, 2004

(65) Prior Publication Data

US 2005/0104605 A1    May 19, 2005

(30) Foreign Application Priority Data

Sep. 18, 2003    (JP)    ............... 2003-326921

(51) Int. Cl.
*G01L 9/12*    (2006.01)
(52) U.S. Cl. ...................................... 73/718
(58) Field of Classification Search ................. 73/700, 73/715, 514.32, 514.01, 718
See application file for complete search history.

(56) References Cited

U.S. PATENT DOCUMENTS 5,392,651 A * 2/1995 Suzuki et al. ............ 73/514.32
5,569,960 A * 10/1996 Kumazawa et al. ........ 257/738
5,611,481 A * 3/1997 Akamatsu et al. ..... 228/180.22
5,901,046 A * 5/1999 Ohta et al. .................. 361/760
6,382,030 B1 * 5/2002 Kihara et al. ................ 73/718

FOREIGN PATENT DOCUMENTS

JP    06-160420 A    6/1994
JP    06-265428 A    9/1994

* cited by examiner

*Primary Examiner*—Edward Lefkowitz
*Assistant Examiner*—Andre Allen
(74) *Attorney, Agent, or Firm*—Blakely Sokoloff Taylor & Zafman

(57) ABSTRACT

A sensor includes a sensor main body, first and second electrodes, an electrode extraction hole, and an interconnection member. A cavity is formed in the sensor main body by joining the outer peripheral portions of the first and second substrates made of an insulating material. The first and second electrodes are formed on the inner surfaces of the first and second substrates which face each other through the cavity. The electrode extraction hole is formed through the first substrate in correspondence with the second electrode. The interconnection member guides the second electrode outside the first substrate through the cavity and the electrode extraction hole. The interconnection member is formed by thermal spraying of metal powder into the cavity from outside the sensor main body through the electrode extraction hole. An electrode extraction structure and electrode extraction method are also disclosed.

10 Claims, 6 Drawing Sheets

SENSOR AND ELECTRODE EXTRACTION STRUCTURE AND METHOD

BACKGROUND OF THE INVENTION

The present invention relates to a sensor such as an electrostatic capacitance type pressure sensor or acceleration sensor and an electrode extraction structure and method.

An electrostatic capacitance type pressure sensor which detects the pressure of a medium to be measured from the displacement of a diaphragm includes a stationary electrode and movable electrode which are formed on the inner surfaces of a sensor main body so as to face each other through a cavity. This sensor is designed to measure the pressure of the medium by detecting a change in capacitance between the two electrodes accompanying the elastic deformation of the diaphragm (see Japanese Patent Laid-Open No. 6-265428).

As an electrode extraction structure for such an electrostatic capacitance type pressure sensor, a structure designed to extract a stationary electrode and movable electrode to the outer surface of the sensor main body which is located on the opposite side to the diaphragm side is known (U.S. Pat. No. 6,382,030).

FIGS. 6A and 6B show the electrostatic capacitance type pressure sensor disclosed in U.S. Pat. No. 6,382,030. An electrostatic capacitance type pressure sensor 1 includes a sensor main body 4 which is formed by superposing first and second substrates 2 and 3 and directly bonding them and a stationary electrode 5 and movable electrode 6 which are formed on the inner surfaces of the sensor main body 4 which face each other.

The first substrate 2 is made of a square plate-like member having a uniform thickness. The stationary electrode 5 is formed on the central portion of the inner surface of the first substrate 2. Three electrode extraction holes 7a to 7c which are through holes are formed in the first substrate 2 so as to be located outside the stationary electrode 5. Of these holes, the electrode extraction hole 7a is a hole for extracting the stationary electrode 5 to the outer surface side of the first substrate 2 via a connection pin 11A. The remaining two electrode extraction holes 7b and 7c are holes for extracting the movable electrode 6 to the outer surface side of the first substrate 2 via connection pins 11B and 11C.

Although the second substrate 3 is formed into a square plate-like member having the same size as that of the first substrate 2, a circular cavity forming recess portion 42 is formed in the central portion of the inner surface of the second substrate 3. An elastically deformable thin diaphragm portion 3A is formed on the central portion of the second substrate 3 in which the cavity forming recess portion 42 is formed. An outer peripheral portion surrounding the diaphragm portion 3A forms a thick stationary portion 3B. The stationary portion 3B is directly bonded to the outer peripheral edge portion of the inner surface of the first substrate 2. The cavity forming recess portion 42 is sealed with the first substrate 2 to form a cavity 21.

The movable electrode 6 on the second substrate 3 is formed on the bottom surface of the diaphragm portion 3A to face the stationary electrode 5. The movable electrode 6 is comprised of a circular sensing electrode 6A and a ring-like reference electrode 6B surrounding the sensing electrode 6A. The sensing electrode 6A and reference electrode 6B respectively have movable electrode extraction portions 9A and 9B extending from the diaphragm portion 3A. The distal end portions of the sensing electrode 6A and reference electrode 6B respectively form electrode extraction pad portions 10A and 10B which respectively face the electrode extraction holes 7b and 7c.

A stationary electrode extraction pad portion 8 is formed on the inner surface of the second substrate 3. The pad portion 8 is not electrically conductive with the movable electrode 6 and formed outside the diaphragm portion 3A to face the electrode extraction hole 7a. Note that the portions of the second substrate 3 on which the pad portions 8, 10A, and 10B are formed are formed to have the same thickness as that of the diaphragm portion 3A.

The connection pins 11A to 11C are respectively inserted into the electrode extraction holes 7a to 7c of the first substrate 2. The connection pins 11A to 11C are connection pins for extracting the stationary electrode 5 and movable electrode 6 to the outer surface of the first substrate 2 (the surface on the opposite side to the surface on which the first electrode 5 is formed). The inner ends of the connection pins 11A to 11C are electrically and mechanically connected to the pad portions 8, 10A, and 10B, respectively, with solder paste 12.

The connection pins 11A to 11C are connected to the pad portions 8, 10A, and 10B with the solder paste 12 by the following method. The connection pins 11A to 11C whose insertion-side ends are coated with the solder paste 12 in advance are inserted into the electrode extraction holes 7a to 7c to bring the solder paste 12 into contact with the pad portions 8, 10A, and 10B. In this state, the solder paste 12 is heated and fused from outside the sensor main body 4, and is then cooled and hardened, thereby connecting the connection pins 11A to 11C to the pad portions 8, 10A, and 10B.

As a material for the stationary electrode 5 and movable electrode 6, a Pt/adhesion strengthening film, e.g., Pt/Nb, is used. As a material for the solder paste 12, a material with low wettability, e.g., Sn—Ag, is used. As a material for the stationary electrode extraction pad portion 8, an Au/barrier layer/adhesion strengthening film having high wettability with the solder paste 12, e.g., Au/Pt/Nb, is used. Since the movable electrode extraction pad portions 10A and 10B are made of the same material as the electrode material, an Au/Pt/Nb film 13 is formed simultaneously with the formation of the stationary electrode pad portion 8 to increase the wettability with the solder paste 12.

In addition, a semiconductor acceleration sensor is also known, in which interconnection members are formed by sputtering instead of soldering as a structure for extracting the stationary electrode 5 and movable electrode 6 to the outside (see Japanese Patent Laid-Open No. 6-160420).

In the semiconductor acceleration sensor disclosed in Japanese Patent Laid-Open No. 6-160420, interconnections are formed by metal deposition (sputtering) on the inner surfaces of through holes formed in a glass plate and predetermined portions near the holes, and are electrically connected to a stationary electrode and movable electrode, respectively.

In the electrostatic capacitance type pressure sensor disclosed in U.S. Pat. No. 6,382,030, in connecting the connection pins 11A to 11C to the pad portions 8, 10A, and 10B, respectively, by using the solder paste 12, if the wettability between the solder paste 12 and the pad portions 8, 10A, and 10B is low, sufficient bonding strength cannot be obtained. In contrast to this, if the wettability is high, the fused solder paste 12 may flow from the pad portions 8, 10A, and 10B to short-circuit the stationary electrode 5 and movable electrode 6 or cause connection failures between the pad portions 8, 10A, and 10B and the connection pins 11A to 11C. This reduces the degree of freedom in selecting materials.

In addition, as a necessary amount of solder paste 12 to connect the connection pins 11A to 11C to the pad portions 8, 10A, and 10B is heated and fused, it takes much time to cool and harden the solder paste, which has a low thermal capacity. This increases the thermal influence on the diaphragm portion 3A, resulting in residual stress in the diaphragm portion 3A. Obviously, when such residual stress is produced, the diaphragm portion 3A is not accurately deformed as the pressure of the diaphragm portion 3A changes, resulting in a deterioration in the measurement precision of the pressure sensor.

According to the semiconductor acceleration sensor disclosed in Japanese Patent Laid-Open No. 6-160420, since interconnections are formed by sputtering, the film-forming speed of the interconnections is very low, and the diffusion is large. It is therefore difficult to form a film having a large thickness (about 10 to 50 µm in general). In addition, the service life of a formed film is short. Since the movable electrode extraction pad portions 10A and 10B are spaced apart from the movable electrode extraction holes 7b and 7c through the cavity space, the interconnections formed on the inner circumferential surfaces of the movable electrode extraction holes 7b and 7c must be electrically connected to the movable electrode extraction pad portions 10A and 10B by sputtering a deposition metal in the cavity space between them. In this case, however, if the thickness of the cavity space is larger than the thickness of an interconnection, no interconnection can be formed in the cavity space. This method is therefore unsuitable for this case.

SUMMARY OF THE INVENTION

It is an object of the present invention to provide a sensor which can reduce the thermal influence of thermal spraying on a diaphragm portion and improve measurement precision by forming electrode extraction interconnection members using deposition layers deposited by thermal spraying of metal powder.

It is another object of the present invention to provide an electrode extraction structure and method which can reduce the thermal influence of thermal spraying by forming electrode extraction interconnection members using deposition layers deposited by thermal spraying of metal powder.

In order to achieve the above objects, according to the present invention, there is provided a sensor comprising a sensor main body in which a cavity is formed by joining outer peripheral portions of a first substrate and second substrates made of an insulating material, a first electrode and second electrode which are formed on inner surfaces of the first substrate and the second substrate which face each other through the cavity, a first electrode extraction hole formed through the first substrate in correspondence with the second electrode, and a first interconnection member which guides the second electrode outside the first substrate through the cavity and the first electrode extraction hole, wherein the first interconnection member is formed by thermal spraying of metal powder into the cavity from outside the sensor main body through the first electrode extraction hole.

DESCRIPTION OF THE PREFERRED EMBODIMENT

An embodiment of the present invention will be described in detail below with reference to the accompanying drawings.

Figure 1A:
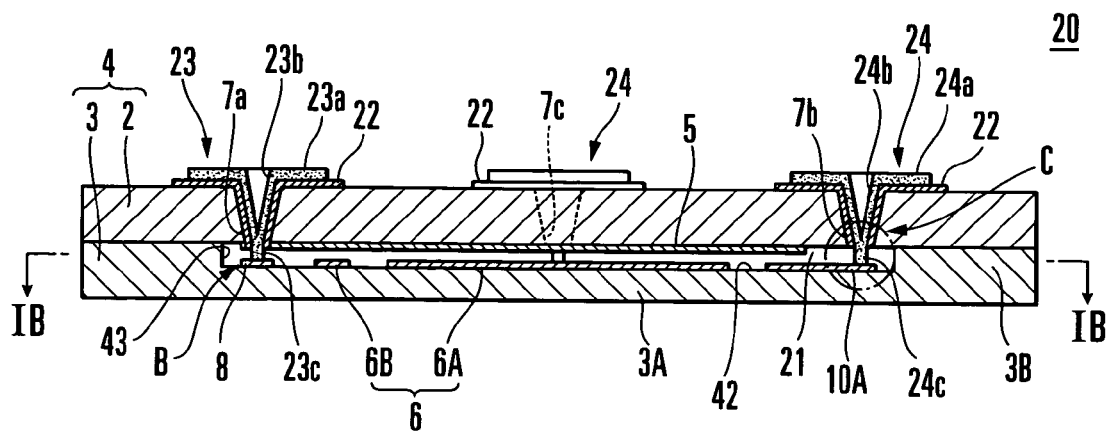
FIGS. 1A and 1B are a sectional view and a sectional view taken along a line IB—IB, respectively, which show an embodiment in which the present invention is applied to an electrostatic capacitance type pressure sensor.
Figure 1B:
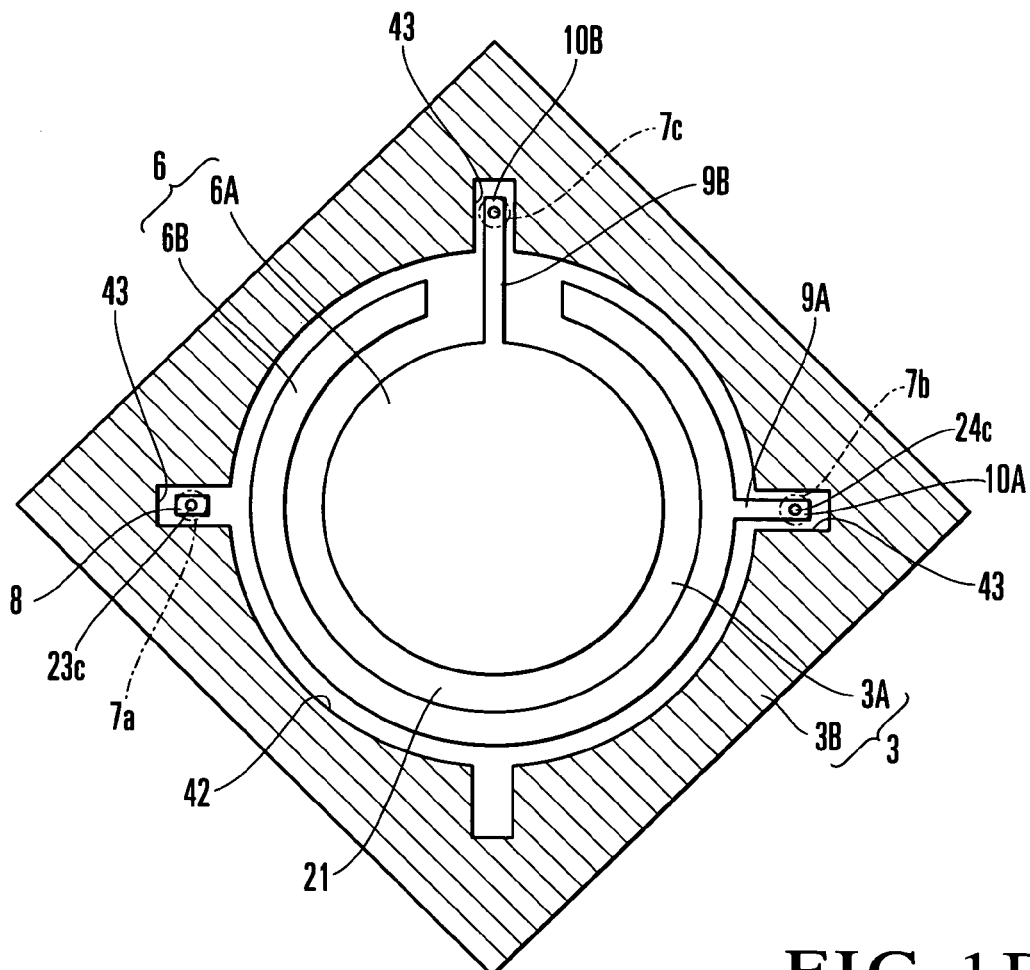
Figure 2A:
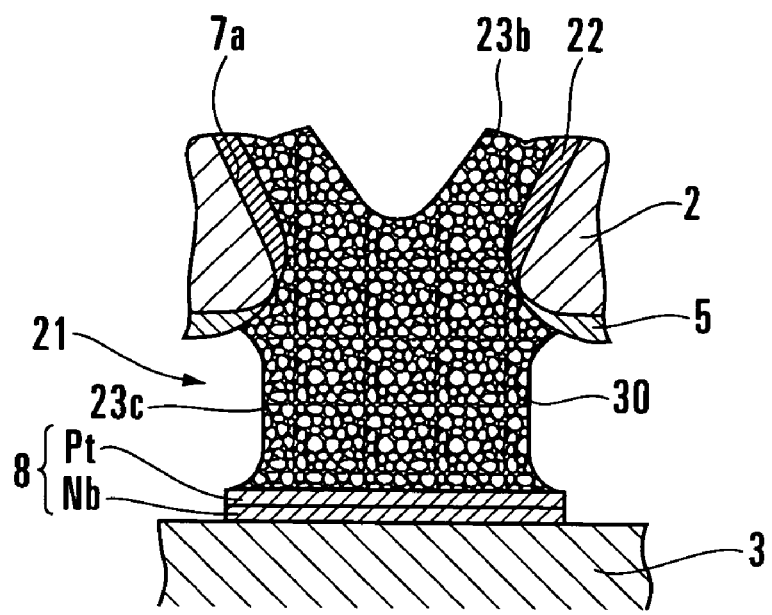
FIGS. 2A and 2B are enlarged views of portions B and C in FIG. 1A, respectively.
Figure 2B:
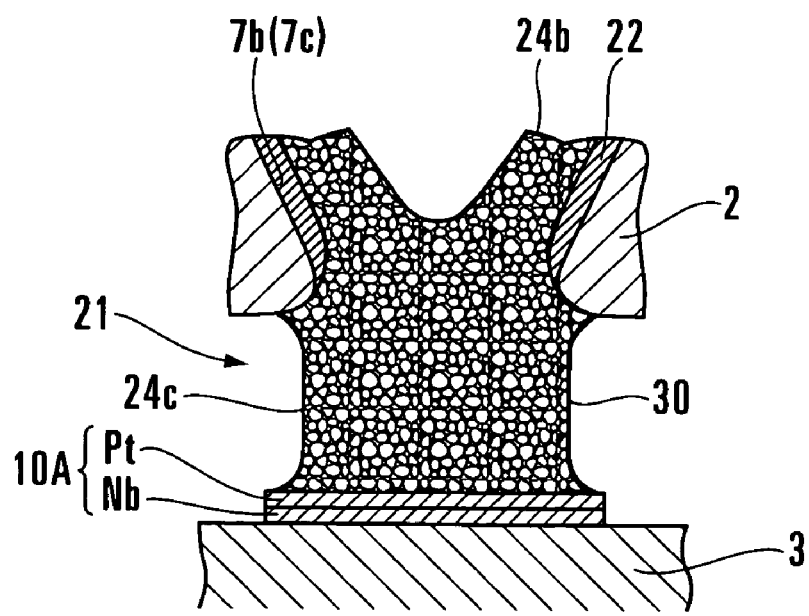

FIG. 1A shows an embodiment in which the present invention is applied to an electrostatic capacitance type pressure sensor. FIGS. 1B, 2A, and 2B show the electrostatic capacitance type pressure sensor. The same reference numerals as in the prior art denote the same parts and portions as in this embodiment, and a description thereof will be omitted as appropriate.

Referring to FIGS. 1A to 2B, an electrostatic capacitance type pressure sensor denoted by reference numeral 20 as a whole includes a sensor main body 4 formed from first and second substrates 2 and 3. The sensor main body 4 is formed by directly bonding (fusion bonding) the outer peripheral edge portions of the first and second substrates 2 and 3, and a cavity 21 is formed in the center of the inner portion of the sensor main body 4.

In this case, as is generally known, direct bonding is a method of bonding joint members by simply mirror-polishing their joint surfaces and bringing them into tight contact. Therefore, any jointing material need not be used. For this reason, no variations in inter-electrode distance occur due to variations in the thickness of a jointing material. This makes it possible to ensure a high-precision inter-electrode distance. In direct bonding, no large applied pressure is required, and it is basically necessary to only stack joint members on each other. Note that the joint members are preferably heated at a proper temperature (about 200 to 1,300° C.) to bond them more reliably.

The first substrate 2 is formed into a square, flat plate having a uniform thickness throughout the entire surface, and a stationary electrode (first electrode) 5 is formed on the central portion of the inner surface. In addition, a stationary electrode extraction hole 7a and movable electrode extraction holes 7b and 7c which are through holes making the inside and outside of the sensor main body 4 communicate with each other are formed in the first substrate 2 so as to be located outside the stationary electrode 5. The stationary electrode 5 is formed into a circle having a diameter smaller than that of the cavity 21. One end of each of the electrode extraction holes 7a, 7b, and 7c is open to the outer surface of the first substrate 2 (the surface on the opposite side of the surface on which the stationary electrode 5 is formed), and the other end of each of the holes is open to the cavity 21. Each of electrode extraction holes 7a, 7b, and 7c is formed into a tapered hole with the diameter of the outer opening portion being about 400 µm, and that of the inner opening portion being about 300 µm.

The second substrate 3 is comprised of an elastically deformable thin diaphragm portion 3A formed on the central portion and a thick stationary portion 3B surrounding the diaphragm portion 3A. The diaphragm portion 3A is formed by forming a circular cavity forming recess portion 42 in the central portion of the inner surface of the second substrate 3 by etching or the like. A movable electrode 6 and stationary electrode extraction pad portion 8 are formed on the bottom surface (cavity inner surface) of the diaphragm portion 3A. The stationary electrode extraction pad portion 8 is formed outside the diaphragm portion 3A so as to face the stationary electrode extraction hole 7a and is spaced apart from the movable electrode 6. A portion of the inner surface of the first substrate 2 which corresponds to the cavity forming recess portion 42 also forms the inner surface of the cavity, and the stationary electrode 5 is formed on the central portion of the inner surface of the cavity.

The movable electrode (second electrode) 6 is comprised of a sensing electrode 6A and reference electrode 6B. The sensing electrode 6A and reference electrode 6B are integrally formed with movable electrode extraction portions 9A and 9B such that they extend outside the stationary portion 3B. The distal end portions of the movable electrode extraction portions 9A and 9B respectively face the movable electrode extraction holes 7b and 7c and form movable electrode extraction pad portions 10A and 10B. The stationary electrode extraction pad portion 8 and movable electrode extraction pad portions 10A and 10B are respectively positioned in three recess portions 43 formed in the inner surface of the second substrate 3. The recess portions 43 communicate with the cavity forming recess portion 42. The widths of the stationary electrode extraction pad portion 8 and movable electrode extraction pad portions 10A and 10B are set to about 400 to 500 µm, which are larger than the diameters of the inner opening portions of the electrode extraction holes 7a, 7b, and 7c.

Figure 6A:
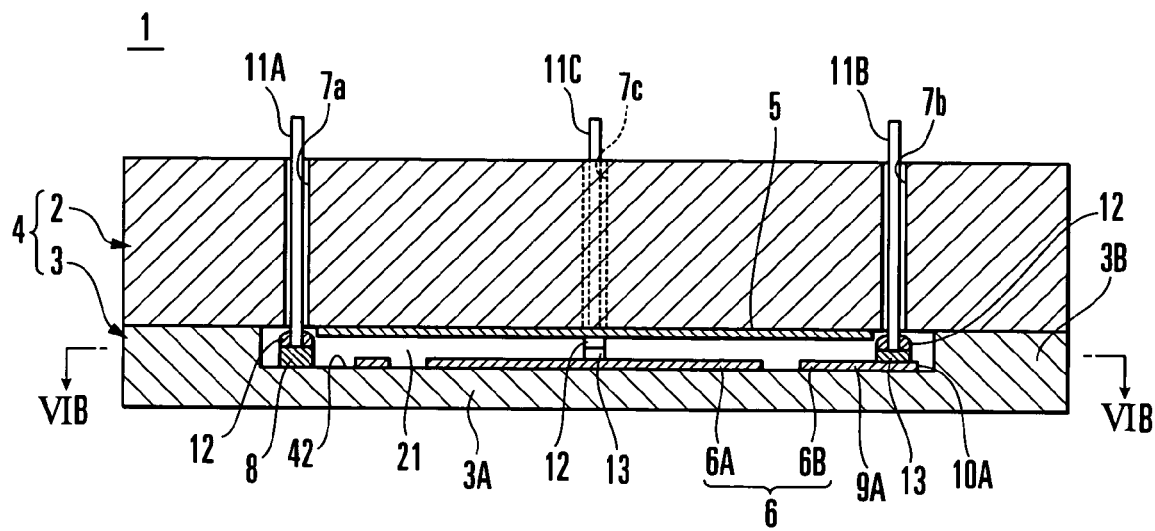
FIGS. 6A and 6B are a sectional view and a sectional view taken along a line VIB—VIB, respectively, which show a conventional electrostatic capacitance type pressure sensor.
Figure 6B:
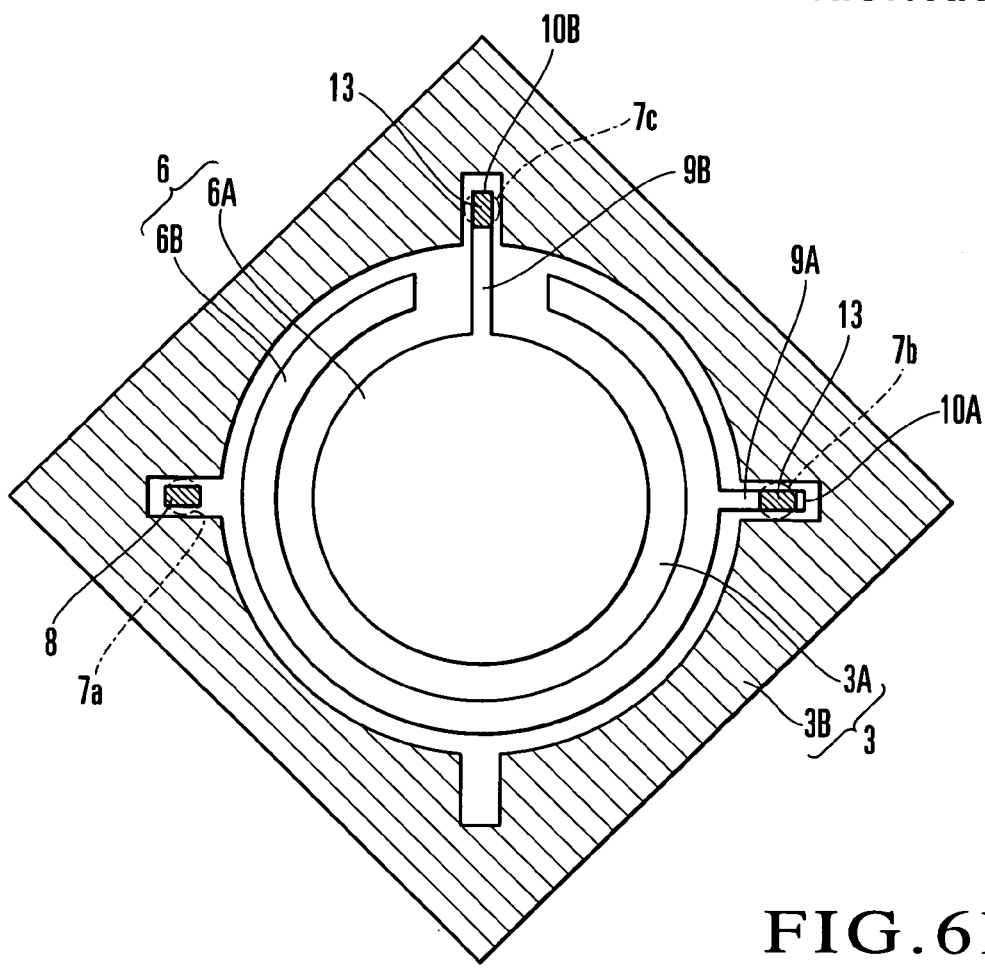

A Pt/adhesion strengthening film is used as a material for the stationary electrode 5, movable electrode 6, stationary electrode extraction pad portion 8, and movable electrode extraction pad portions 10A and 10B. As the adhesion strengthening film, a film made of Ti, V, Cr, Nb, Zr, Hf, Ta, or the like is used. This embodiment exemplifies the case wherein the stationary electrode 5, movable electrode 6, and pad portions 8, 10A, and 10B are made of Pt/Nb. The upper and lower layers of each of the stationary electrode 5, movable electrode 6, and pad portions 8, 10A, and 10B are made of Pt and Nb, respectively. Note that an Au/Pt/Nb film 13 shown in FIG. 6 is not formed on the upper surfaces of the movable electrode extraction pad portions 10A and 10B. This is because, in the present invention, since connection pins 11A to 11C are not connected to pads by using solder paste 12 unlike in the prior art, there is no need to consider wettability with the solder paste 12. In addition, the stationary electrode extraction pad portion 8 is not always required. This is because the pad portion 8 is provided to improve the reliability of an upper layer portion in forming a deposition layer by thermal spraying (flame spraying).

The stationary electrode 5 and stationary electrode extraction pad portion 8 are extracted to the outer surface of the first substrate 2 via the stationary electrode extraction hole 7a by using an interconnection member 23. For this purpose, the interconnection member 23 is continuously formed around the stationary electrode extraction hole 7a on the outer surface of the first substrate 2, on the inner circumferential surface of the stationary electrode extraction hole 7a, and in the cavity space between the stationary electrode 5 and the stationary electrode extraction pad portion 8, thus forming an extraction structure for the stationary electrode 5.

Likewise, the movable electrode 6 is also extracted to the outer surface of the first substrate 2 via the movable electrode extraction holes 7b and 7c by using interconnection members 24. For this purpose, the interconnection members 24 are continuously formed around the movable electrode extraction holes 7b and 7c on the outer surface of the first substrate 2, on the inner circumferential surfaces of the movable electrode extraction holes 7b and 7c, and in the cavity space between the movable electrode extraction holes 7b and 7c and the movable electrode extraction pad portions 10A and 10B, thus forming an extraction structure for the movable electrode 6.

In forming such interconnection members 23 and 24, adhesion strengthening films 22 are preferably formed in advance on the peripheral edge portions of the electrode extraction holes 7a, 7b, and 7c on the outer surface of the first substrate 2 on their inner circumferential surfaces. The adhesion strengthening films 22 are formed to increase the adhesion between the first substrate 2 and the interconnection members 23 and 24, and are made of the same material (Nb) as that for the adhesion strengthening films for the stationary electrode 5 and movable electrode 6. Note that the adhesion strengthening film 22 formed on the inner circumferential surface of the stationary electrode extraction hole 7a is mechanically and electrically connected to the stationary electrode 5.

The interconnection member 23 which extracts the stationary electrode 5 outside the first substrate 2 is formed by thermally spraying fine metal power such as heated/fused Pt toward the pad portion 8 via the stationary electrode extraction hole 7a. The interconnection member 23 is comprised of three deposition layers, i.e., a deposition layer 23a deposited on the peripheral edge portion of the stationary electrode extraction hole 7a on the outer surface of the first substrate 2, a deposition layer 23b deposited on the inner circumferential surface of the stationary electrode extraction hole 7a, and a deposition layer 23c deposited on the upper surface of the pad portion 8 to bridge the pad portion 8 and the interconnection member 23. The deposition layers 23a, 23b, and 23c are integrally and continuously formed to form an electrically conductive deposition layer.

The interconnection members 24 which extract the movable electrode 6 outside the first substrate 2 are formed by thermally spraying fine metal power such as heated/fused Pt toward the pad portions 10A and 10B via the movable electrode extraction holes 7b and 7c. Each of the interconnection members 24 is comprised of three deposition layers, i.e., a deposition layer 24a deposited on the peripheral edge portion of a corresponding one of the movable electrode extraction holes 7b and 7c on the outer surface of the first substrate 2, a deposition layer 24b deposited on the inner circumferential surface of a corresponding one of the movable electrode extraction holes 7b and 7c, and a deposition layer 24c deposited on the upper surface of a corresponding one of the pad portions 10A and 10B to bridge the pad portion and the deposition layer 24b. The deposition layers 24a, 24b, and 24c are integrally and continuously formed to form an electrically conductive deposition layer.

The interconnection members 23 and 24 formed from such deposition layers can be formed by a general plasma spraying method using a plasma jet which is one of various types of thermal spraying methods.

The plasma spraying method is generally a method of supplying a thermal spraying material in powder form into an ultra-high-temperature plasma jet of an inert gas such as Ar, He, or $N_2$, heating/fusing the powder, and thermally spraying the fused fine powder to the member to be coated by using a spray gun. This plasma spraying method is excellent in linearity, in particular, and hence suppresses the spread of a spray coating. Another major feature of this method is that the film-forming speed is high to allow easy formation of a relatively thick spray coating. In addition, the method is characterized in that a thermal spraying material in fine powder form quickly loses heat and is cooled and hardened when it strikes a portion to be plasma-sprayed, and hence exerts only a small thermal influence on the member to be coated.

A method of forming the interconnection members 23 and 24 will be further described with reference to FIGS. 1A, 2A, and 2B. As shown in FIGS. 1A, 2A, and 2B, when metal powder 30 made of a fused fine conductive material is thermally sprayed toward the electrode extraction holes 7a to 7c on the outer surface of the first substrate 2 by using the plasma spraying method, part of the powder is deposited on the peripheral edge portions of the electrode extraction holes 7a, 7b, and 7c on the outer surface of the first substrate 2 to form the deposition layers 23a and 24a. Another part of the powder is deposited on the inner circumferential surfaces of the electrode extraction holes 7a, 7b, and 7c to form the deposition layers 23b and 24b. The remaining fused metal powder passes through the electrode extraction holes 7a to 7c and strikes the surfaces of the pad portions 8, 10A, and 10B to be hardened and deposited, thereby forming the deposition layers 23c and 24c. The deposition layers 23c and 24c gradually grow and increase in height with the progression of plasma spraying. Eventually, these layers become columnar deposition layers reaching the inner surface of the first substrate 2 through the cavity space. The deposition layer 23c bridges the deposition layer 23b and the pad portion 8. The deposition layers 24c bridge the deposition layers 24b and the pad portions 10A and 10B. As a consequence, the stationary electrode 5 and movable electrode 6 are extracted to the outer surface of the first substrate 2 by the interconnection members 23 and 24.

A manufacturing sequence for the electrostatic capacitance type pressure sensor 20 having the above structure will be described with reference to FIGS. 3A to 3D, 4A to 4E, and 5. These drawings show only the manufacture of one sensor chip. In practice, however, many sensors 20 having the same structure are simultaneously manufactured by performing a predetermined process for a wafer having a required size and cutting the wafer into pieces by dicing or the like as in the case of a semiconductor manufacturing sequence.

Figure 3A:
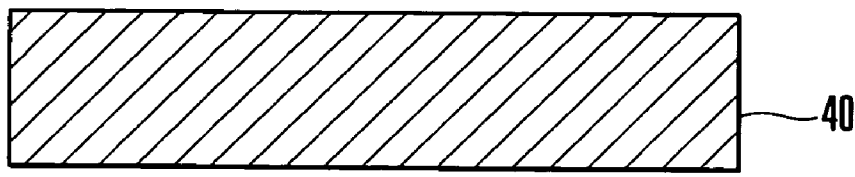
FIGS. 3A to 3D are sectional views for explaining the steps in manufacturing a sensor.
Figure 3B:
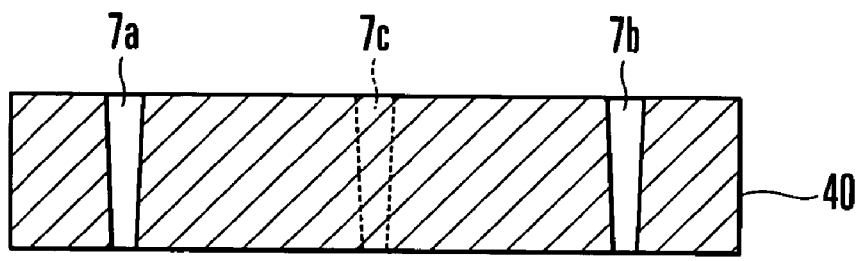

A sapphire wafer 40 which has two polished surfaces and a predetermined size and thickness is prepared first (FIG. 3A). The sapphire wafer 40 is a base material to be formed into the first substrate 2 described above. The electrode extraction holes 7a, 7b, and 7c which are through holes are formed in the sapphire wafer 40 by a machining, laser machining, ultrasonic machining, or the like (FIG. 3B).

Figure 3C:
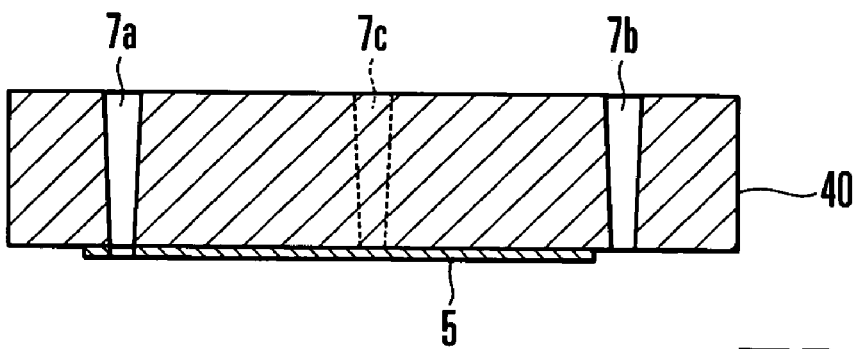

The stationary electrode 5 is then formed on the inner surface of the sapphire wafer 40 (FIG. 3C). The stationary electrode 5 is formed by vacuum deposition, ion plating, sputtering, or the like.

Figure 3D:
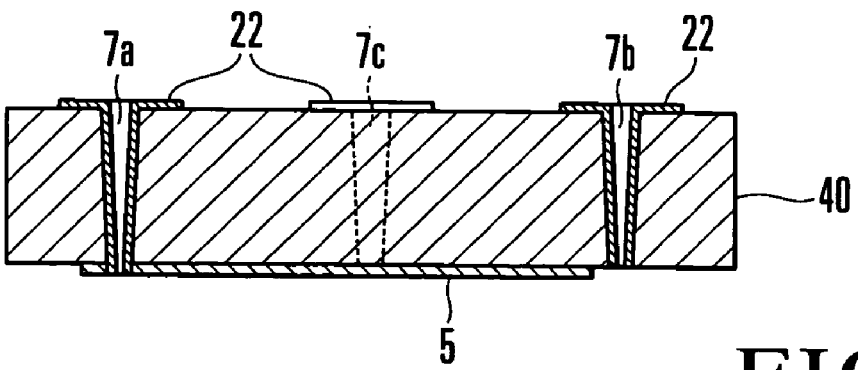

The adhesion strengthening films 22 are formed on the peripheral edge portions of the electrode extraction holes 7a to 7c on the outer surface of the sapphire wafer 40 and the inner circumferential surfaces of the holes by sputtering or the like (FIG. 3D). With this process, the first substrate 2 is formed.

Figure 4A:
FIGS. 4A to 4E are sectional views for explaining the steps in manufacturing a sensor.
Figure 4B:
Figure 4C:
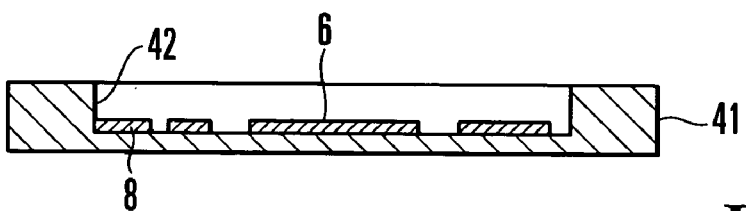

Likewise, a sapphire wafer 41 which has two polished surfaces and a predetermined size and thickness is prepared first (FIG. 4A). The sapphire wafer 41 is a base material to be formed into the second substrate 3 described above. The cavity forming recess portion 42 is formed in the inner surface of the sapphire wafer 41 by photolithography, etching, or end milling (FIG. 4B). The movable electrode 6 is formed on the bottom surface of the recess portion 42 by using the same material and method as those for the stationary electrode 5 (FIG. 4C). At this time, the stationary electrode extraction pad portion 8 and movable electrode extraction pad portions 10A and 10B are simultaneously formed. With this process, the second substrate 3 is formed. A thin central portion of the sapphire wafer 41 in which the recess portion 42 is formed is a portion to be formed into the diaphragm portion 3A of the second substrate 3 described above. A thick portion formed outside the thin central portion is a portion to be formed into the stationary portion 3B.

Figure 4D:
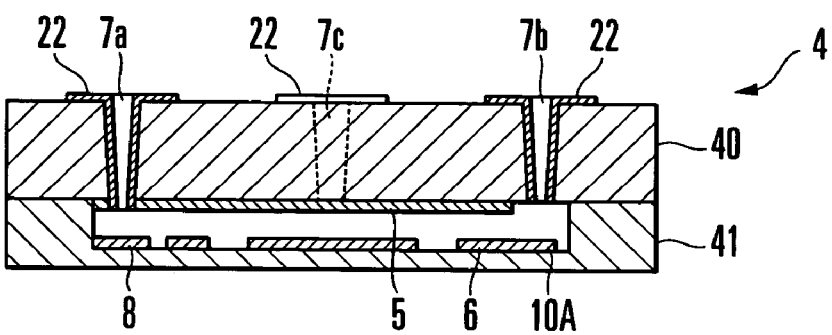
Figure 4E:
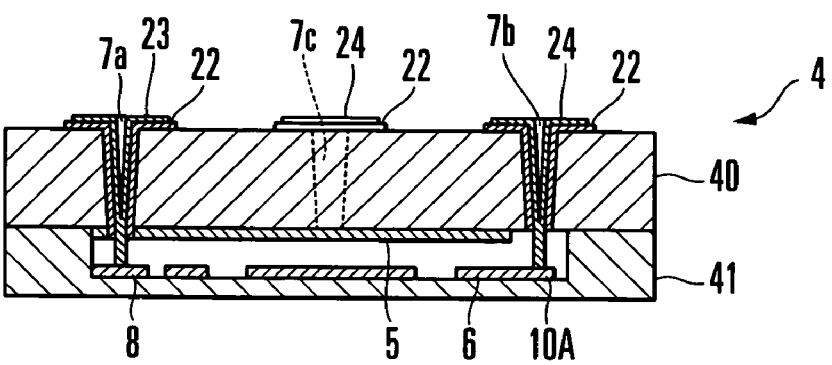

After the sapphire wafers 40 and 41 are cleaned, the wafers are superposed on each other such that the stationary electrode 5 faces the movable electrode 6 and are heated to a predetermined temperature to directly bond the outer peripheral edge portion of the sapphire wafer 40 to the stationary portion 3B of the sapphire wafer 41, thus forming the sensor main body 4 (FIG. 4D).

The sensor main body 4 is then mounted in the plasma spraying device 45 shown in FIG. 5, and the interconnection members 23 and 24 are sequentially formed by a method to be described later. The stationary electrode 5 and movable electrode 6 are extracted to the outer surface of the sapphire wafer 40. Note that as a preprocess for forming the interconnection members 23 and 24 by the plasma spraying method, in order to increase the adhesion of coatings, the surfaces of portions to be plasma-sprayed may be roughed by chemical etching or the like.

When the interconnection members 23 and 24 are to be formed by using a plasma spraying device 45, a mask 46 is placed on the sapphire wafer 40 to cover the surface other than the portions to be plasma-sprayed. Three through holes 50 are formed in the mask 46 in correspondence with the electrode extraction holes 7a to 7c of the sapphire wafer 40.

A working gas (Ar) is then changed into a high-temperature, high-pressure plasma gas by applying a predetermined voltage between the anode and cathode of the plasma spraying device 45. The fine metal powder 30 made of a conductive material is fed into this plasma gas, together with a carrier gas (Ar), and fused. The fused metal powder 30 is sequentially sprayed to the electrode extraction holes 7a, 7b, and 7c, together with a plasma gas 48, by using a thermal spray gun 47, thereby forming the interconnection members 23 and 24.

Figure 5:
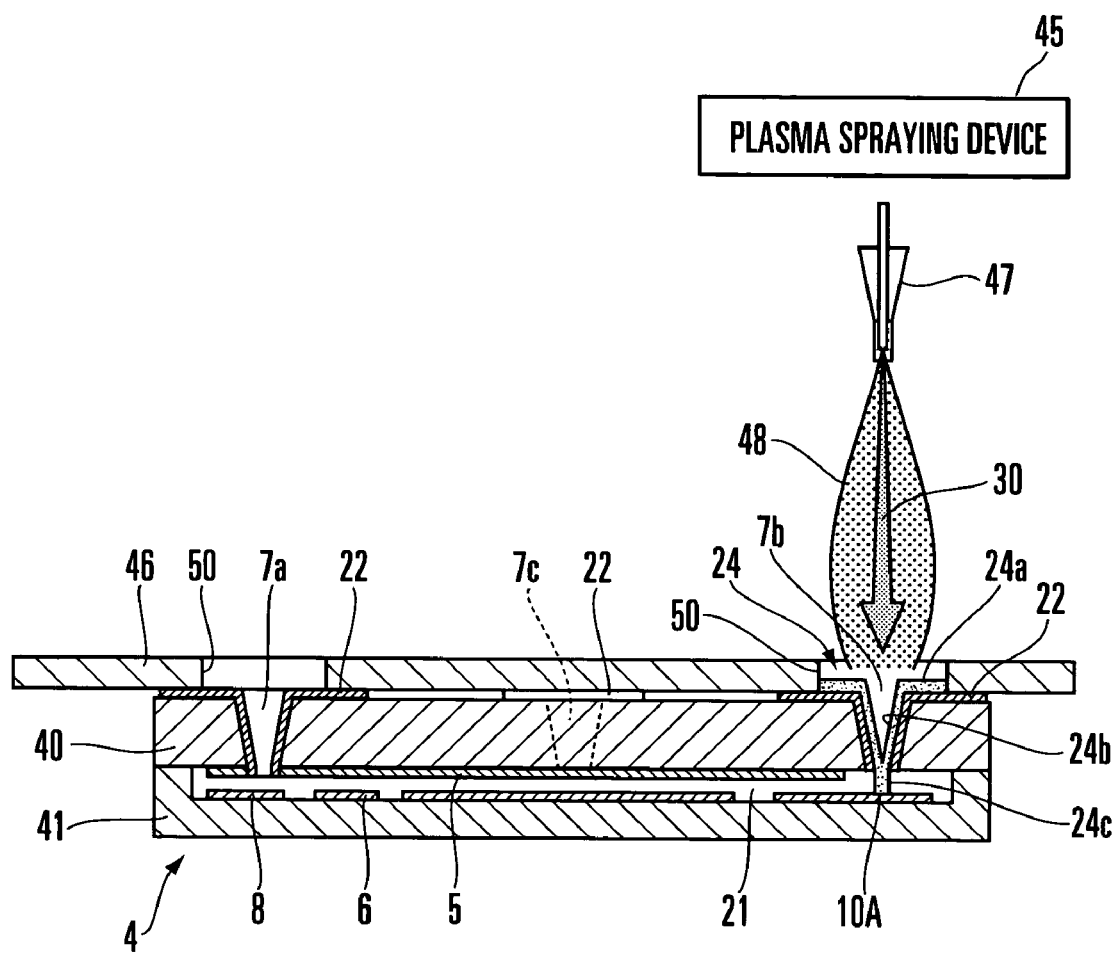
FIG. 5 is a view for explaining the step of forming an interconnection member by the plasma spraying method.

FIG. 5 shows a case wherein the interconnection member 24 is formed in the movable electrode extraction hole 7b. When the fused metal powder 30 is sprayed toward the movable electrode extraction hole 7b, part of the powder sequentially comes into contact with the adhesion strengthening films 22 formed on the outer surface of the sapphire wafer 40 and the inner circumferential surface of the movable electrode extraction hole 7b, and is cooled, hardened, and deposited, thereby forming the deposition layers 24a and 24b. The deposition layers 24a and 24b are finally jointed to each other to form a continuous conductive film (see FIG. 1A). The metal powder 30 which passes through the movable electrode extraction hole 7b without coming into contact with the adhesion strengthening film 22 is cooled, hardened, and deposited upon coming into contact with the surface of the pad portion 10A, thereby forming the deposition layer 24c. The deposition layer 24c gradually grows and increases in height as the fused metal powder 30 is sprayed and sequentially deposited. In the end, the deposition layer 24c is joined to the lower end of the deposition layer 24b deposited on the inner circumferential surface of the movable electrode extraction hole 7b through the cavity space to form a continuous conductive film. The pad portion 10A is therefore extracted to the outer surface of the first substrate 2 by the interconnection member 24 comprised of the deposition layers 24a, 23b, and 23c, thus finishing the formation of the interconnection member 24 in the movable electrode extraction hole 7b by the plasma spraying method.

Upon completion of the formation of the interconnection member 24 in the movable electrode extraction hole 7b by plasma spraying, plasma spraying is sequentially performed with respect to the electrode extraction holes 7a and 7c in the same manner as described above to form the interconnection members 23 and 24, and the pad portions 8 and 10B are extracted to the outer surface of the first substrate 2 (FIG. 4C).

The interconnection members 23 and 24 generally have a thickness of 10 to 100 µm. The metal powder 30 generally has an average particle diameter of about 10 to 50 µm, and preferably 10 to 40 µm. If the average particle diameter is set to 10 µm or less, and preferably 0.5 to 1 µm, a denser interconnection member hardly containing pores can be formed, which further increases the adhesion with respect to the substrate and electrodes. In addition, if the particle diameter is small, the metal powder can be thermally sprayed to even an electrode extraction hole with a small diameter.

When the step of forming the interconnection members 23 and 24 by the plasma spraying method is complete, the sensor main body 4 is extracted from the plasma spraying device 45 and is cut/separated to a predetermined size by etching, dicing, laser, or the like, thereby obtaining a plurality of sensors 20. With this process, the manufacture of the sensor 20 is finished.

Forming the interconnection members 23 and 24 by the plasma spraying method in this manner makes it possible to greatly shorten the film formation time because the film-forming speed is much higher than that by vapor deposition, sputtering, CVD, ion plating, and the like. In addition, since the plasma spraying method can easily form thick spray coatings having a thickness of about 10 to 100 µm, the pad portions 8, 10A, and 10B can be reliably connected to the interconnection members 23 and 24, thereby increasing the service life.

Furthermore, since plasma spraying is generally performed in the atmosphere or under a reduced pressure, the apparatus and sensor main body 4 can be easily handled as compared with a case wherein a deposition apparatus, sputtering apparatus, CVD, or the like is used.

Each particle of the fused metal powder 30 generally has a diameter as small as about 10 to 50 µm, and hence has a small thermal capacity. When such particles come into contact with the pad portions 8, 10A, and 10B, they are sequentially cooled and hardened to form the deposition layers 23c and 24c. This method can therefore considerably reduce the macroscopic thermal influence on the diaphragm portion 3A as compared with the conventional method shown in FIGS. 6 and 7, in which the connection pins 11A to 11C are connected to the pad portions by using the solder paste 12. The diaphragm portion 3A is therefore almost free from thermal distortion, and the detection precision of the sensor 20 can be improved.

In addition, the plasma spraying method uses an inert gas such as Ar, and hence has merits such as high cleanliness level, little oxidation of the metal powder 30, and high controllability.

The above embodiment has exemplified the case wherein the adhesion strengthening films 22 are formed on the inner circumferential surfaces of the electrode extraction holes 7a, 7b, and 7c and the outer surface of the first substrate 2. However, the adhesion strengthening films 22 are not always required.

In addition, the above embodiment has exemplified the case wherein the interconnection members 23 and 24 are formed by using the general plasma spraying method as a thermal spraying method. However, the present invention is not limited to this. These interconnection members may be formed by a flame spraying method using the combustion of a gas, a detonation flame spraying method using gas explosion, an electric arc spraying method using arc discharge between metal wires, a wire explosion spraying method using discharge explosion of a metal wire, or a microplasma spraying method.

The above embodiment has exemplified the case wherein the cavity forming recess portion 42 is formed in the second substrate 3. However, the present invention is not limited to this. The cavity forming recess portion 42 may be formed in only the first substrate 2 or formed in each of the first and second substrates 2 and 3.

Furthermore, this embodiment has exemplified the case wherein the first and second substrates 2 and 3 are made of sapphire. However, the present invention is not limited to this. These substrates may be formed from silicon or the like.

This embodiment has exemplified the case wherein the present invention is applied to the electrostatic capacitance type pressure sensor 20 having the diaphragm portion 3A. However, the present invention is not limited to this. For example, the present invention may be applied to an electrostatic capacitance type pressure sensor in which the rigidity of the central portion of the second substrate 3 is increased, and the outer peripheral edge portion is formed thin to be compressible/deformable so as to change the electrostatic capacitance between the electrodes 5 and 6 upon compression/deformation of the outer peripheral edge portion. In addition, the present invention can be applied to other types of sensors such as acceleration sensors in addition to pressure sensors.

As has been described above, according to the sensor and electrode extraction method of the present invention, deposition layers of metal powder are formed as interconnection members by thermally spraying fused fine metal powder toward electrode extraction holes by the thermal spraying method and depositing the powder, and the electrodes formed on the inner surface of the sensor main body are extracted to the outside by using the interconnection members. This can therefore considerably reduce the macroscopic thermal influence as compared with the case wherein solder paste is used, thereby improving the measurement precision of the sensor.

In addition, in forming interconnection members by the thermal spraying method, since fused metal powder is quickly cooled and hardened without flowing unlike solder paste. There is therefore no need to form electrode pad portions by using a material with poor wettability. This increases the degree of freedom in selecting materials. Furthermore, there is no possibility of short-circuiting between electrodes, and hence a high-reliability sensor can be obtained.

Moreover, the thermal spraying method is higher in film-forming speed than methods such as sputtering, vapor deposition, and CVD, and can easily form relatively thick spray coatings. This makes it possible to increase the service life.

What is claimed is:

1. A sensor comprising:
a sensor main body in which a cavity is formed by joining outer peripheral portions of a first substrate and second substrates made of an insulating material;
a first electrode and second electrode which are formed on inner surfaces of the first substrate and the second substrate which face each other through the cavity;
a first electrode extraction hole formed through the first substrate in correspondence with said second electrode; and
a first interconnection member which guides said second electrode outside the first substrate through the cavity and said first electrode extraction hole,
wherein said first interconnection member is formed by thermal spraying of metal powder into the cavity from outside said sensor main body through said first electrode extraction hole.

2. A sensor according to claim 1, wherein said first interconnection member comprises a deposition layer which is deposited around said first electrode extraction hole on an outer surface of the first substrate, a deposition layer which is deposited on an inner circumferential surface of said first electrode extraction hole and electrically conductive with the deposition layer, and a deposition layer which is deposited on a pad portion of said second electrode, crosses the cavity, and is electrically conductive with the deposition layer.

3. A sensor according to claim 1, wherein
the second substrate includes an elastically deformable diaphragm portion on a central portion thereof,
said second electrode comprises a movable electrode formed on an inner surface of the diaphragm portion, and
said first electrode comprises a stationary electrode facing said movable electrode.

4. A sensor according to claim 3, wherein
the first substrate further comprises a second electrode extraction hole communicating with the cavity and a second interconnection member which guides said first electrode outside the first substrate trough the second electrode extraction hole, and
the second interconnection member being formed by thermal spraying of metal powder from outside said sensor main body into the cavity through the second electrode extraction hole.

5. A sensor according to claim 4, further comprising a stationary electrode extraction pad portion which is formed on the inner surface of the second substrate in correspondence with the second electrode extraction hole, said pad portion and said first electrode being bridged by the second interconnection member.

6. A sensor according to claim 4, further comprising a second adhesion strengthening film which is formed on an inner circumference surface of said second electrode extraction hole and around the second electrode extraction hole on an outer surface of the first substrate,
wherein the second interconnection member is formed on said second adhesion strengthening film.

7. A sensor according to claim 1, further comprising a first adhesion strengthening film which is formed on an inner circumference surface of said first electrode extraction hole and around said first electrode extraction hole on an outer surface of the first substrate,
wherein said first interconnection member is formed on said first adhesion strengthening film.

8. An electrode extraction structure comprising:
a sensor main body in which a cavity is formed by joining outer peripheral portions of a first substrate and second substrates made of an insulating material;
an electrode extraction hole which is formed in the first substrate and communicates with the cavity;
an electrode which is formed on an inner surface of the second substrate in correspondence with said electrode extraction hole; and
an interconnection member which guides said electrode outside the first substrate through the cavity and said electrode extraction hole,
wherein said interconnection member is formed by thermal spraying of metal powder from outside said sensor main body to said electrode through said electrode extraction hole.

9. An electrode extraction method comprising the steps of:
forming a sensor main body having a cavity inside by joining an outer peripheral edge portion of a first substrate including a first electrode extraction hole, a second electrode extraction hole, and a first electrode to an outer peripheral edge portion of a second substrate including a second electrode such that the first electrode faces the second electrode; and
forming a first interconnection member by thermal spraying of metal powder from the first electrode extraction hole to a pad portion of the second electrode in the cavity, and guiding the second electrode outside the first substrate.

10. A method according to claim 9, wherein the step of forming the first interconnection member and guiding the second electrode outside the first substrate comprises the steps of: forming a deposition layer deposited around the first electrode extraction hole on an outer surface of the first substrate; forming a deposition layer deposited on an inner circumferential surface of the first electrode extraction hole; and forming a deposition layer which is deposited on the pad portion of the second electrode, crosses the cavity, and is electrically conductive with the deposition layer.

* * * * *